Oct. 3, 1967 R. R. MOATS ETAL 3,345,586

DELAY STRUCTURE FOR TRAVELING WAVE DEVICE

Filed Sept. 10, 1962 3 Sheets-Sheet 1

INVENTORS
ROBERT R. MOATS
WILLIAM A. FRUTIGER
BY [signature]
ATTORNEY

INVENTORS
ROBERT R. MOATS
WILLIAM A. FRUTIGER
BY John F. Lawler
ATTORNEY

INVENTORS
ROBERT R. MOATS
WILLIAM A. FRUTIGER
BY John F. Fawler
ATTORNEY 3,345,586
Patented Oct. 3, 1967

3,345,586

DELAY STRUCTURE FOR TRAVELING WAVE DEVICE

Robert R. Moats, Saratoga, Calif., and William A. Frutiger, Liberty, Pa., assignors to Sylvania Electric Products Inc., a corporation of Delaware Filed Sept. 10, 1962, Ser. No. 222,496
1 Claim. (Cl. 333—31)

This invention relates to crossed field traveling-wave amplifiers, and more particularly to ladder-type slow wave structures incorporated into such devices.

Crossed field amplifiers are particularly useful for generating high power at short wavelengths, but such amplifiers provide stable operation only over a narrow frequency band. This limited bandwith is attributable to the dispersive nature of the delay line in the amplifier wherein the phase velocity of the signal varies as a function of its frequency. Attempts have been made to physically change the slow wave structure to reduce dispersion, and an example of such effort is described in Patent No. 2,920,227. However, the dispersion for such slow wave structures is still prohibitively high for many applications so the range of cross field amplifier application is correspondingly limited.

A general object of this invention is the provision of a ladder delay line having improved dispersion characteristics.

A specific object of the invention is the provision of a ladder delay line wherein the ladder rungs are located substantially apart from the signal disturbing support members in order to maximize coupling along the structure.

A further object is the provision of a ladder delay line which has improved dispersion characteristics and which can be readily produced at low cost.

In accordance with the present invention, the dispersion of a ladder delay line is decreased by locating T-shaped shields in the spaces between ladder rungs. Shields having this shape serve to significantly increase coupling of the signal because the amount of conductive material located adjacent to the ends of the ladder rungs is held to a minimum.

The invention, together with its manner of construction and mode of operation, will be better understood from the following description when considered in conjunction with the drawings in which.

Figure 1:
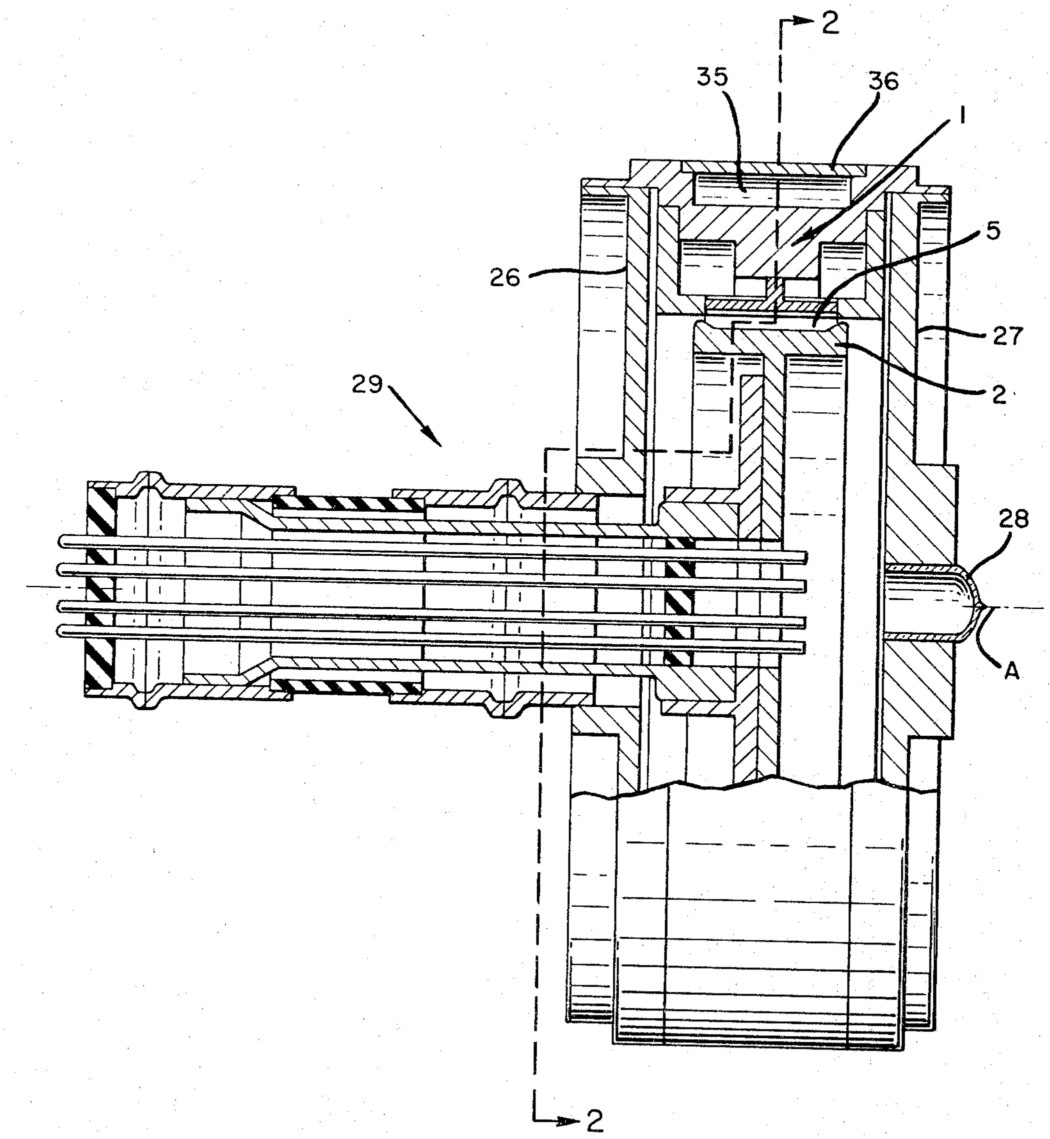
FIGURE 1 is a longitudinal view, partially cut away, of a forward wave crossed field amplifier having a slow wave structure embodying the invention.
Figure 2:
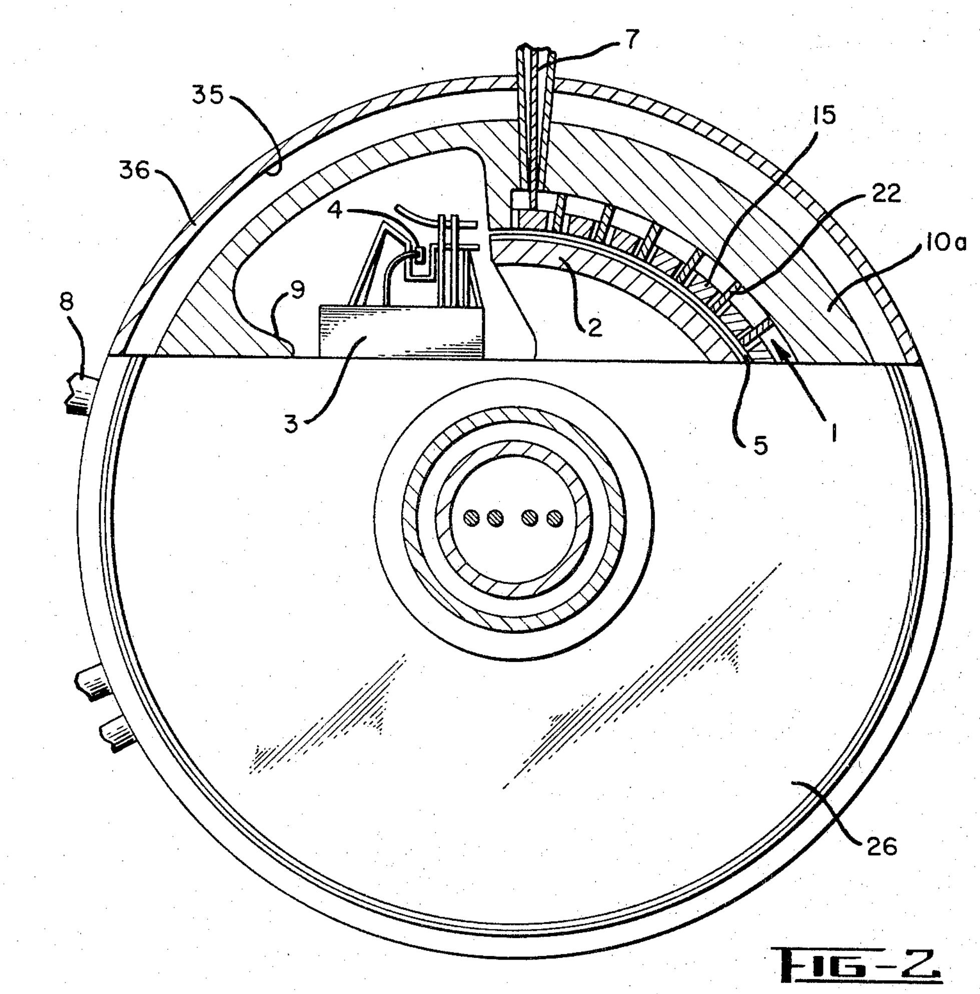
FIGURE 2 is a transverse section taken along line 2—2 of FIGURE 1 to illustrate the gun and slow wave structure of the amplifier of FIGURE 1.

Referring now to FIGURES 1 and 2, a crossed field traveling-wave amplifier is shown having an axis A, an energy propagating cylindrical ladder delay line 1 disposed with its axis coincident with axis A, and a coaxial cylindrical electrode 2 (referenced hereinafter as a sole) enclosed by an evacuated envelope formed in part by the delay line. An electron gun assembly 3, FIGURE 2, including a cathode 4 is provided adjacent the sole 2 for producing a beam of electrons in the interaction space 5 bound by the sole and the delay line. By proper adjustment of the electrostatic and magnetic fields in the interaction space, the beam is directed in a circular path with respect to the axis of the tube and terminates on collector 9. Intermediate the cathode and collector, the beam interacts with an electromagnetic signal coupled to the delay line by input coupler 7 so that the signal is amplified when extracted at output coupler 8.

Figure 3:
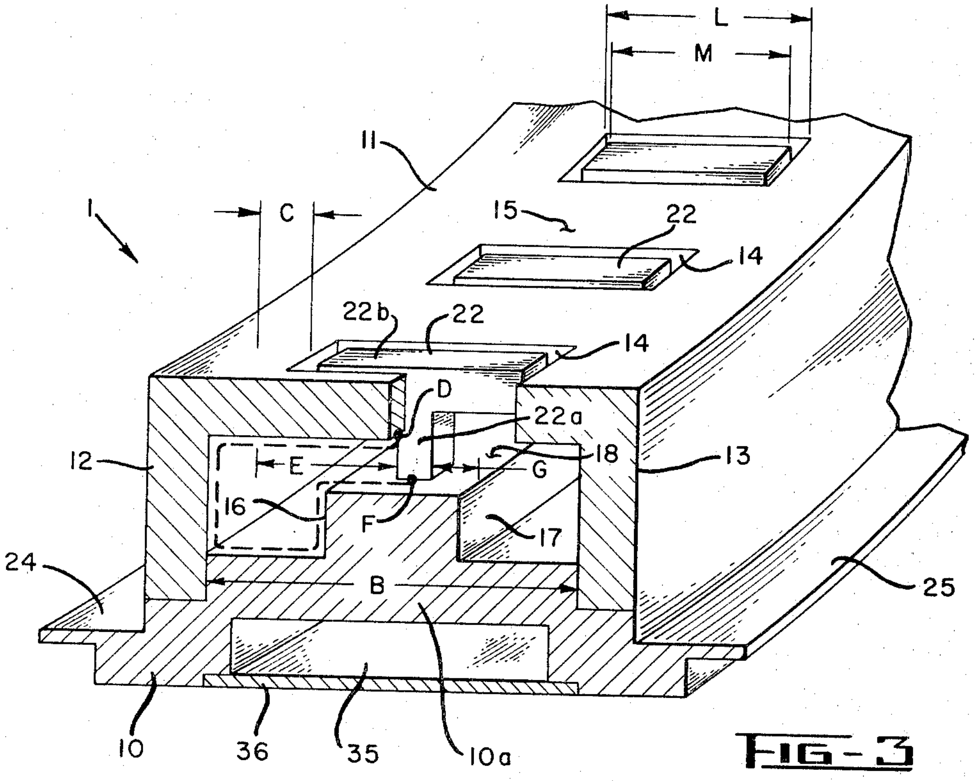
FIGURE 3 is a perspective view, greatly enlarged, of the delay line of the invention.

Referring now to FIGURE 3, there is shown a delay line 1 constructed in accordance with the invention and comprising a modified rectangular waveguide formed into a cylinder and having cylindrical broad walls 10 and 11 and annular side walls 12 and 13. Inner broad wall 11 is formed with a series of rectangular slots 14 which connect the interaction space 5 with the interior of the delay line 1. Slots 14 may be formed by automatic stamping operations to speed fabrication and are equally spaced apart by portions 15 of the broad wall. The structure is named after a ladder which it resembles, and consistent with this terminology the portions 15 between the slots are hereinafter called "rungs." The length L of each rung 15 determines the upper cutoff frequency of the operation of the delay line and is shorter than the corresponding inside dimension B of the waveguide by a distance 2C. The spacing C between the ends of the rungs and the side walls 12 and 13 increases the electrical path length through each rung 15 to the inner broad wall 10 (ground plane) of the delay line as explained hereinafter.

Outer broad wall 10 of the delay line has an annular ridge member 10*a* which projects therefrom toward and is spaced from inner broad wall 11 for the full length of the line. The ridge 10*a* has planar side surfaces 16 and 17 parallel with the side walls 12 and 13 and has an inner surface 18 coextensive with and uniformly spaced from broad wall 11.

Attached to broad surface 18 of the ridge are a series of shield elements 22 located midway between the side walls 12 and 13. Each element 22 is formed into a T of uniform cross section and comprises a shank 22*a* and an upper arm 22*b*. Arm 22*b* terminates entirely within the slot 14 of the broad wall 11 and is joined at its midpoint to shank 22*a*. The attaching plane of these parts is coincident with the inner surface of the rungs 15. The length of arm 22*b* is designated M and is less than one-half the electrical wavelength at the upper cutoff frequency of the line. Shank 22*a* is spaced a distance E from the planes containing the ends of the rungs (i.e., the ends of slot 14). Thus only a minimum portion of each shield is located immediately adjacent to the ends of rungs in the plane of mutual inductive coupling. In addition, the path length between each rung and ground plane in the plane of the former is also increased by the T-shaped form of the shield in that the width of the shield is less than the width of the ridge by distance dimension G.

Support of the delay line adjacent to the sole 2 of the tube is provided by a pair of axially spaced mounting flanges 24 and 25 integral with waveguide outer wall 10. These flanges serve to mount the delay line on cover plates 26 and 27, see FIGURE 1. The latter plates are apertured to receiver exhaust tubulation 28 and cylindrical lead-in assembly 29 of the tube. Assembly 29 conducts electrical energy from appropriate sources to the electron gun 3 and additionally supports the sole 2 adjacent to the delay line. In order to cool the delay line during operations, cooling fluid from a cooling apparatus, not shown, pases through an annular cavity 35 having sides defined by a cover plate 36 and outer broad wall 10 of the delay line.

Figure 4:
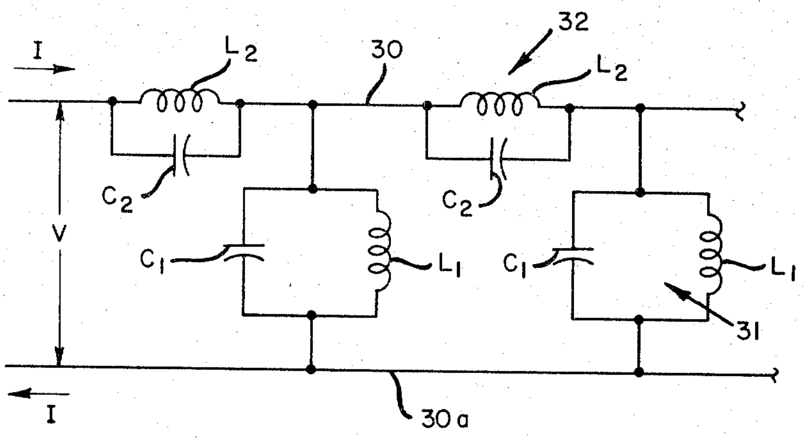
FIGURE 4 is a diagram of the electrical circuit equivalent of the delay line shown in FIGURE 3.

In FIGURE 4, there is shown a chain of passband filter circuits having lumped constants which are the electrical analog of the delay line of FIGURE 3 and which includes a two-wire transmission line comprising parallel wires 30 and 30*a*. A voltage difference V exists between the wires and acts across a distributed shunt capacitance $C_1$ and distributed inductance $L_1$ which together form a parallel anti-resonant network 31 tuned to half the electrical wavelength at the upper cutoff frequency of the line. The current I flows in parallel wires in the directions indicated and is affected by the series connection of the distributed inductance $L_2$ and distributed capacitance $C_2$ forming an anti-resonant network 32.

Capacitance $C_1$ and $C_2$ and inductance $L_1$ and $L_2$ are analogized to the delay line 1 in the following manner. In the plane of each rung 15 of FIGURE 3, the voltage difference V exists between points D and F, and distributed capacitance $C_1$ and inductance $L_1$ represent the potential difference and the path length between these points. Between the rungs, current flow I, FIGURE 4, is affected by distributed capacitance $C_2$ and inductance $L_2$ representing the potential difference and effective path length therebetween. That is, capacitor $C_2$ represents the difference in electrical field potential between adjacent rungs—termed "mutual capacitive coupling." Likewise, inductor $L_2$ represents effective path length between rungs—termed "mutual inductive coupling"—provided by a radio frequency current circulating between the rungs and generating lines of magnetic force. These lines are summed and provide a magnetic field which couples to the magnetic field of an adjacent rung.

The relative magnitudes of the distributed capacitance and inductance comprising the filter circuits are increased or decreased by including ridge 10*a* and shields 22 in the delay line structure. Ridge 10*a* increases the magnitude of shunt capacitance $C_1$ and inductance $L_1$ by decreasing the spacing between the ground plane and the rungs as indicated by the proximity of points D and F and the dotted line therebetween. The effective spacing of ends of rungs 15 from waveguide side walls 12 and 13 increases the path length of currents passing through each rung to the ground plane and so $L_1$ is further increased.

Shields 22 located between rungs reduce the magnitude of the mutual coupling capacitance $C_2$ and increase the magnitude of $C_1$. The mutual inductance coupling $L_2$ between rungs is simultaneously increased by spacing the ends of the rungs from side walls 12 and 13 and undercutting the shield to form a T so that the shank 22*a* is spaced a maximum distance from the ends of the rungs. That is, the shank 22*a* is spaced a distance defined as the difference between distances E and C. This is desired since in order to maximize the pass band characteristics of the line, the coupling capacitance $C_2$ should be minimized and the magnitude of the coupling inductance $L_2$ should be maximized.

Figure 5:
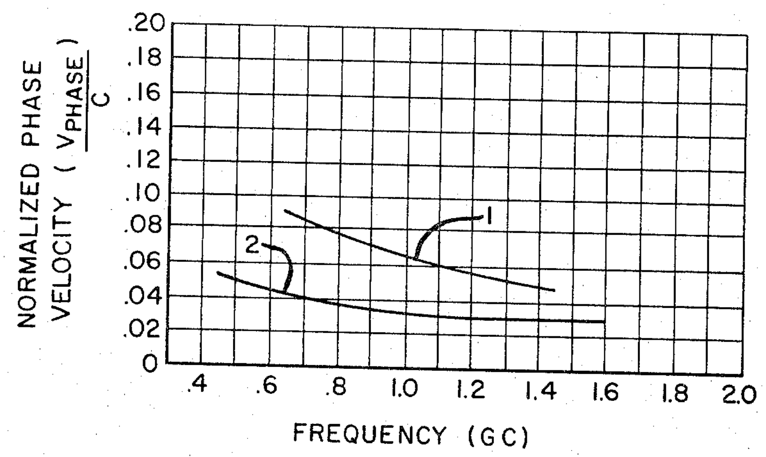
FIGURE 5 shows comparison dispersion curves of the delay line of FIGURE 3 and of the prior art.

In FIGURE 5, there is shown a graphic representation of the dispersive characteristic of the slow wave structure embodying the invention (curve 2) which is contrasted with the dispersion character of a ridged slow wave structure using shields of rectangular cross sections (curve 1), each structure having the following dimensions:

| Item | Prior Art Delay Line (Curve 1) | Figure 3 Delay Line (Curve 2) |
|---|---|---|
| Rungs, 15: | | |
| Width | 0.040 | 0.040 |
| Pitch | 0.100 | 0.100 |
| Length L | 3.000 | 3.000 |
| Thickness | 0.080 | 0.080 |
| Slots, 14: | | |
| Length L | 3.000 | 3.000 |
| Width | 0.060 | 0.060 |
| Thickness | 0.080 | 0.080 |
| Ridge, 10a: | | |
| Height | 1.000 | 1.000 |
| Length | 1.500 | 1.500 |
| Shield, 22: | | |
| Height | 0.101 | 0.101 |
| Length at Slot | 1.500 | 2.940 |
| Length at Ridge | 1.500 | 0.160 |
| Thickness | 0.020 | 0.020 |

As shown, the maximum variation in the normalized phase velocity in curve 1 of the signal in the frequency range from 0.65 to 1.45 gc. is 0.04. In curve 2, the maximum variation in the normalized phase velocity of the test signal is 0.019 between 0.475 to 1.60 gc. and 0.0085 for the frequency range shown by curve 1. Comparison indicates an 80% decrease in dispersion.

This invention is not limited to the particular details of construction, material and process as described, as many equivalents will suggest themselves to those skilled in the art. For example, the delay line embodying the invention could be a rectilinear structure.

What is claimed is:

A ladder delay line adapted to propagate an electromagnetic signal comprising an elongated rectangular waveguide having an axis and having first and second narrow walls, and first and second broad walls, said first broad wall having inner and outer surfaces and having a longitudinal series of transverse rectangular slots extending therethrough, said slots being symmetrical about and equally spaced along said axis and having equal lengths defining a corresponding series of rungs having lengths equal to those of the slots, said rungs having a mutual capacitive coupling supporting a potential difference therebetween and having a mutual inductive coupling representing the effective electrical path length therebetween, said mutual capacitance and inductance being representable as a first parallel resonant circuit, each of said rungs and the waveguide wall opposite thereto having a distributed capacitance supporting a potential difference therebetween and having a distributed inductance representing the effective electrical length therebetween, said distributed capacitance and inductance comprising a second parallel resonant circuit, said rungs having a length less than the spacing of said narrow walls for increasing the electrical path lengths between said rungs and said second broad wall for increasing the distributed inductance, the rung and slot lengths being equal to approximately one-half of the mid-band wavelength of the signal to be propagated, a longitudinally extending ridge having a rectangular cross section and located on the interior of said second broad wall centered between said narrow walls coextensive with said slots and symmetrically of said axis for increasing the distributed capacitance, said ridge being spaced from said rungs and having a width less than the spacing of said narrow walls for increasing the distributed inductance, and a series of T-shaped shield elements symmetrical about said axis and having uniform thickness, each of said elements comprising a shank portion and an upper arm portion, said shank portion being attached to the surface of said ridge proximate said first broad wall midway between said narrow walls and extending therefrom in a direction normal to said axis and parallel with said narrow walls for increasing the distributed capacitance, said shank having a width less than the length of said rungs for increasing the mutual inductance and less than the width of said ridge for increasing the distributed inductance, said upper arm portion being joined at its midpoint to said shank portion with the junction lying in a plane coincident with said inner surface of said first broad wall, each of said arm portions extending in a direction normal to said axis and parallel with said broad walls and terminating entirely within a slot and spaced from said first broad wall defining said slot for decreasing the mutual capacitance, said arm having a length less than a half wavelength at the upper cutoff frequency of the line, said second resonant circuit being resonant at approximately half the upper cutoff frequency of the line.

(References on following page)

References Cited

UNITED STATES PATENTS

| | | | |
|---|---|---|---|
| 2,687,777 | 8/1954 | Warnecke et al. | 333—31 |
| 2,889,488 | 6/1959 | Reverdin | 315—39.3 |
| 2,920,227 | 1/1960 | Dohler | 315—3.5 |
| 2,922,918 | 1/1960 | Wasserman | 333—31 |
| 2,942,142 | 6/1960 | Dench | 315—3.5 |
| 2,945,981 | 7/1960 | Karp | 315—3.5 |
| 2,982,879 | 5/1961 | Halot | 315—3.5 |
| 3,086,180 | 4/1963 | Arnaud et al. | 333—31 |
| 3,218,582 | 11/1965 | Arnaud et al. | 333—31 |

HERMAN KARL SAALBACH, *Primary Examiner.*

C. BARAFF, *Assistant Examiner.*